United States Patent Office 3,634,382
Patented Jan. 11, 1972

3,634,382
GRANULAR PROPYLENE POLYMERS
Hans-Georg Trieschmann, Hambach, Wolfgang Rau, Heidelberg, Heinz Mueller-Tamm, Ludwigshafen, and Helmut Pfannmueller, Limburgerhof, Germany, assignors to Badische Anilin- & Soda-Fabrik AG, Ludwigshafen (Rhine), Germany
No Drawing. Filed Aug. 1, 1969, Ser. No. 846,954
Claims priority, application Austria, Aug. 12, 1968, A 7,875/68
Int. Cl. C08f 3/10, 27/26, 29/02
U.S. Cl. 260—93.7
5 Claims

ABSTRACT OF THE DISCLOSURE

Production of granular propylene polymers in which (1) propylene is polymerized by means of a Ziegler-Natta catalyst in the absence of solvents or diluents so that a powdered polymer is directly obtained which has a special specification, (2) this polymer is given a thermal and mechanical aftertreatment in a special way without the catalyst having been previously deactivated, and (3) the polymer thus aftertreated is homogenized, extruded and granulated by conventional methods. The polymer obtained is particularly easy to process.

---

The present invention relates to a process for the production of granular easily processable propylene polymers wherein (1) a polymer is prepared by polymerization of propylene using a titanium-containing catalyst of the Ziegler-Natta type, (2) this polymer is given a thermal mechanical aftertreatment and (3) the polymer aftertreated in this way is homogenized, extruded and granulated.

In the conventional methods of this type it is known to be a disadvantage that the thermal mechanical aftertreatment requires an undesirably high expenditure of time, energy and equipment and/or that the products are unsatisfactory in their properties in further processing, for example permit only low rates of processing or have troublesome ash contents.

The present invention has for an object a process of the abovementioned type which has few or none of the said disadvantages.

We have found that this object is achieved by preparing a propylene polymer to a specially selected specification in the first stage of the process, subjecting this propylene polymer to a thermal mechanical treatment under special conditions in the second stage of the process and homogenizing, extruding and granulating the polymer by conventional methods in the third stage of the process.

The present invention is accordingly concerned with a process for the production of readily processable propylene polymer granules which comprises:

(1) Preparing a polymer by polymerization of propylene using a titanium-containing catalyst of the Ziegler-Natta type, (2) Giving this polymer a thermal mechanical aftertreatment and (3) Homogenizing, extruding and granulating the polymer thus treated.

In accordance with the invention the process comprises:

(1) Carrying out the polymerization of propylene in the absence of solvents or diluents so that a polymer is directly formed which is in the form of powder, which contains from 5 to 30 p.p.m. by weight of titanium, which has a fraction of from 10 to 35% by weight which is soluble in boiling n-heptane, and which has an intrinsic viscosity of from 6 to 10 (intrinsic viscosities measured in each case in a 0.1% solution in decahydronaphthalene at 130° C. and extrapolated to concentration zero; $=[\eta]$ value);

(2) Exposing this polymer, without previously having deactivated the catalyst, to a shear velocity of 20 to 1000 sec.$^{-1}$ at a temperature of from 250° to 350° C. until its intrinsic viscosity is from 1.5 to 4.0; and (3) Homogenizing, extruding and granulating by a conventional method the polymer aftertreated in the said manner.

The following details are given concerning the stages of the process according to this invention:

(1) The polymerization of propylene by means of a Ziegler-Natta type of catalyst containing titanium in the absence of solvents or diluents is known. It may be derived from the literature that in the polymerization known as "gas phase polymerization" or "dry polymerization" under certain other conditions a propylene polymer can be obtained which is powdery and which in other respects satisfies the specification which is critical for the purposes of the present invention; cf. for example Austrian Pats. 202,346, 204,775 and 220,806. To this extent, the process as such for preparing the primary propylene polymer in question forms no part of the present invention. It should be added that the powdered polymer is particularly suitable for the purposes of the present invention if it has a particle size of from 0.2 to 3.0 mm., preferably from 0.3 to 1.5 mm. In addition, the polymer preferably has a titanium content of from 10 to 20 p.p.m. by weight, a fraction of 20 to 30% by weight which is soluble in boiling n-heptane, and an intrinsic viscosity of from 7 to 9.

(2) The thermal mechanical aftertreatment of the propylene polymer is carried out without previous deactivation of the catalyst. This is of vital importance for the result of the process according to the invention and clearly distinguishes the process from prior art methods. The aftertreatment as such is carried out by means of conventional equipment provided it permits operation at the specified temperature and with the specified shear velocity. Examples of suitable equipment are screw extruders, preferably screw kneaders or high-speed screw extruders.

The conditions preferably used in the aftertreatment are: tempeatures of from 280° to 340° C. and shear velocities of from 40 to 700 sec.$^{-1}$. The propylene polymers thus formed should preferably have an intrinsic viscosity of from 2.2 to 2.8.

It is also an advantage to add conventional auxiliaries, particularly antioxidants and lubricants, in the conventional amounts to the polymer in the course of the aftertreatment. Very suitable antioxidants are aromatic amines or phenol derivatives, if desired in combination with thiodialkanoic esters or phosphites, in amounts of from 0.02 to 0.3, preferably from 0.1 to 0.2% by weight (with reference to the polymer). Very suitable lubricants are alkali metal salts, alkaline earth metal salts and amides of fatty acids having from eighteen to twenty-two carbon atoms in amounts of from 0.1 to 0.5%, preferably from 0.2 to 0.3%, by weight (with reference to the polymer).

(3) The homogenization, extrusion and granulation are carried out in conventional equipment. They are well known so that further description is unnecessary here. It should be added however that it is particularly economical for the thermal mechanical aftertreatment and the homogenization, extrusion and granulation to be carried out in a single unit, for example by means of a twin shaft screw kneader.

Propylene polymer in the form of granules which can be easily processed is obtained by the process according to this invention in a simple and economical manner; it is very well suited for example for the production of film, sheeting, strip, hollow articles and injection moldings.

The invention is illustrated by the following example.

EXAMPLE

Stage 1:

Polymerization is carried out in a stirred reactor having a capacity of 5 m.$^3$ at a controlled propylene pressure of 35 atmospheres gauge at a temperature of 90° C. (which is kept constant by regulation) and in the absence of solvents or diluents. The reactor is operated continuously, 25 g./h. of $TiCl_3 \cdot \frac{1}{3} AlCl_3$ and 42.5 g./h. of $Al(C_2H_5)_3$ being introduced separately and continuously; pure propylene is introduced continuously through a separate line, the supply being controlled so that the propylene pressure remains constant at 35 atmospheres gauge. The output of the reactor is 410 kg./h. of powdered polymer having a particle size from 0.3 to 2.5 mm. It contains 15 p.p.m. by weight of titanium and has a fraction of 27.5% which is soluble in boiling n-heptane and an intrinsic viscosity of 7.8.

Stages 2 and 3.—100 parts by weight of polymer obtained in stage 1 and freed from adherent propylene is immediately mixed with 0.2 part by weight of the stearic ester of 2,6 - ditert - butyl - 4 - methyl - 6 - β - hydroxyethylphenol and 0.2 part by weight of potassium stearate. This mixture is given a thermal mechanical aftertreatment in a twin shaft screw kneader at a shear velocity of 400 sec.$^{-1}$ and then homogenized, extruded and granulated, the temperature profile of the material in the kneader being 250° C. after the feed zone, 270° to 300° C. in the zones for the thermal-mechanical aftertreatment and 230° C. in the zone for homogenization. The residence time (40 seconds) is chosen so that the granules obtained have an intrinsic viscosity of 2.5.

We claim:

1. In a process for the production of easily processable granules of propylene polymer by (1) polymerizing propylene by means of a Ziegler-Natta type catalyst containing titanium, (2) subjecting this propylene polymer to a thermal mechanical aftertreatment and (3) homogenizing, extruding and granulating the propylene polymer which has been aftertreated in this way, the improvement which comprises in combination (1) carrying out the polymerization of the propylene in the absence of solvents or diluents so that a propylene polymer is immediately obtained which is in the form of a powder, which contains from 5 to 30 p.p.m. by weight of titanium, which has a fraction of from 10 to 35% by weight which is soluble in boiling n-heptane and which has an intrinsic viscosity of from 6 to 10; and (2) exposing the produced propylene polymer, without the catalyst having been previously deactivated, to a shear velocity of from 20 to 1000 sec.$^{-1}$ at a tempertaure of 250° to 350° C. until its intrinsic viscosity is from 2.2 to 2.8; and thereafter homogenizing, extruding and granulating the produced propylene polymer.

2. A process as claimed in claim 1 wherein the polymer has a titanium content of from 10 to 20 p.p.m. by weight, a fraction of 20 to 30% by weight which is soluble in boiling n-heptane and an intrinsic viscosity of from 7 to 9.

3. A process as claimed in claim 1 wherein the polymer has a particle size of from 0.2 to 3.0 mm.

4. A process as claimed in claim 1 wherein the polymer has a particle size of from 0.3 to 1.5 mm.

5. A process as claimed in claim 1 wherein stage (2) is carried out at a temperature of from 280° to 340° C. and with a shear velocity of from 40 to 700 sec.$^{-1}$.

References Cited

UNITED STATES PATENTS

| | | | |
|---|---|---|---|
| 3,013,003 | 12/1961 | Maragliano | 260—93.7 |
| 3,121,070 | 2/1964 | Coover et al. | 260—45.5 |
| 3,345,352 | 10/1967 | Baron | 260—93.7 |

FOREIGN PATENTS

| | | | |
|---|---|---|---|
| 15,807 | 7/1965 | Japan | 260—93.7 |

OTHER REFERENCES

The Effect of Polymerization Catalysts on the Rate of Degradation of Isotactic Polypropylene by Rysary and Balaban (Scientific-Research Institute of Macromolecular Chemistry, Berno, Czechoslovakia), Nov. 26, 1960.

JOSEPH L. SCHOFER, Primary Examiner

W. F. HAMROCK, Assistant Examiner

U.S. Cl. X.R.

260—23 R, 94.9 GC